United States Patent [19]

Krenz et al.

[11] Patent Number: 4,949,934
[45] Date of Patent: Aug. 21, 1990

[54] COMPUTER STAND

[75] Inventors: Horst M. Krenz, Bridgman, Mich.; Fred E. Wahlemeier, San Antonio, Tex.

[73] Assignee: Zenith Data Systems Corporation, Mt. Prospect, Ill.

[21] Appl. No.: 333,373

[22] Filed: Apr. 5, 1989

[51] Int. Cl.⁵ ............................................. A47B 81/00
[52] U.S. Cl. .................................. 248/676; 248/147; 248/918; 312/213; 206/320
[58] Field of Search ............... 248/918, 637, 676, 127, 248/146, 147, 152, 174, 176, 310, 311.2; 312/287, 213; 206/320, 305

[56] References Cited

U.S. PATENT DOCUMENTS

| | | | |
|---|---|---|---|
| 1,860,224 | 5/1932 | Bode | 312/213 |
| 2,797,800 | 7/1957 | Sider | 206/320 |
| 2,801,740 | 8/1957 | Fallert | 206/320 |
| 3,184,275 | 5/1965 | Gardner | 312/213 |
| 3,266,175 | 8/1966 | Palumbi | 206/305 |
| 3,482,895 | 12/1969 | Becklin | 206/305 |
| 3,824,472 | 7/1974 | Engel | 206/305 |
| 4,458,813 | 7/1984 | Tushinsky | 206/320 |
| 4,658,298 | 4/1987 | Takeda | 206/320 |
| 4,786,121 | 11/1988 | Lyons | 312/214 |

Primary Examiner—Ramon O. Ramirez
Assistant Examiner—Robert A. Olson

[57] ABSTRACT

A computer stand for supporting a horizontal compute in a vertical position.

12 Claims, 4 Drawing Sheets

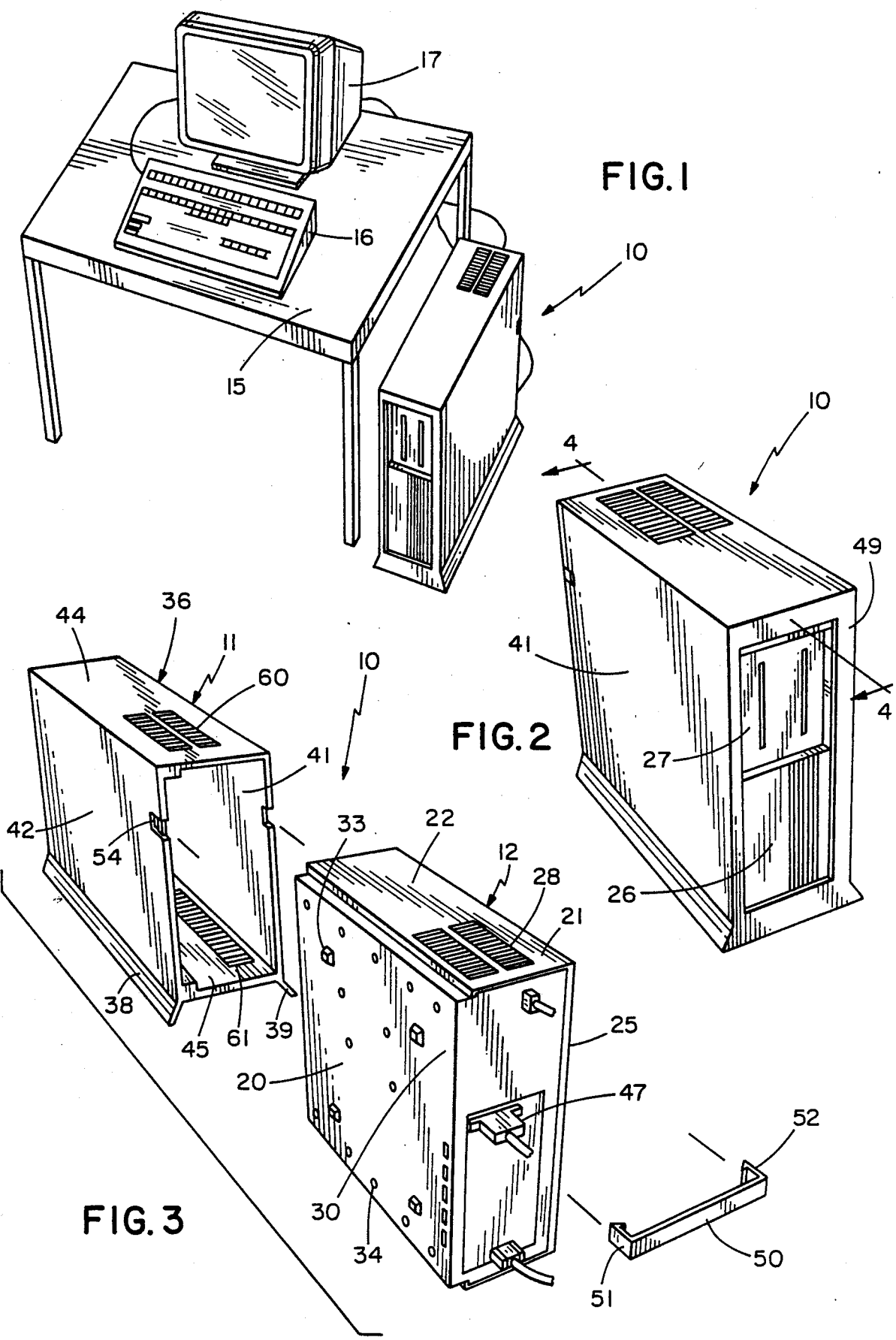

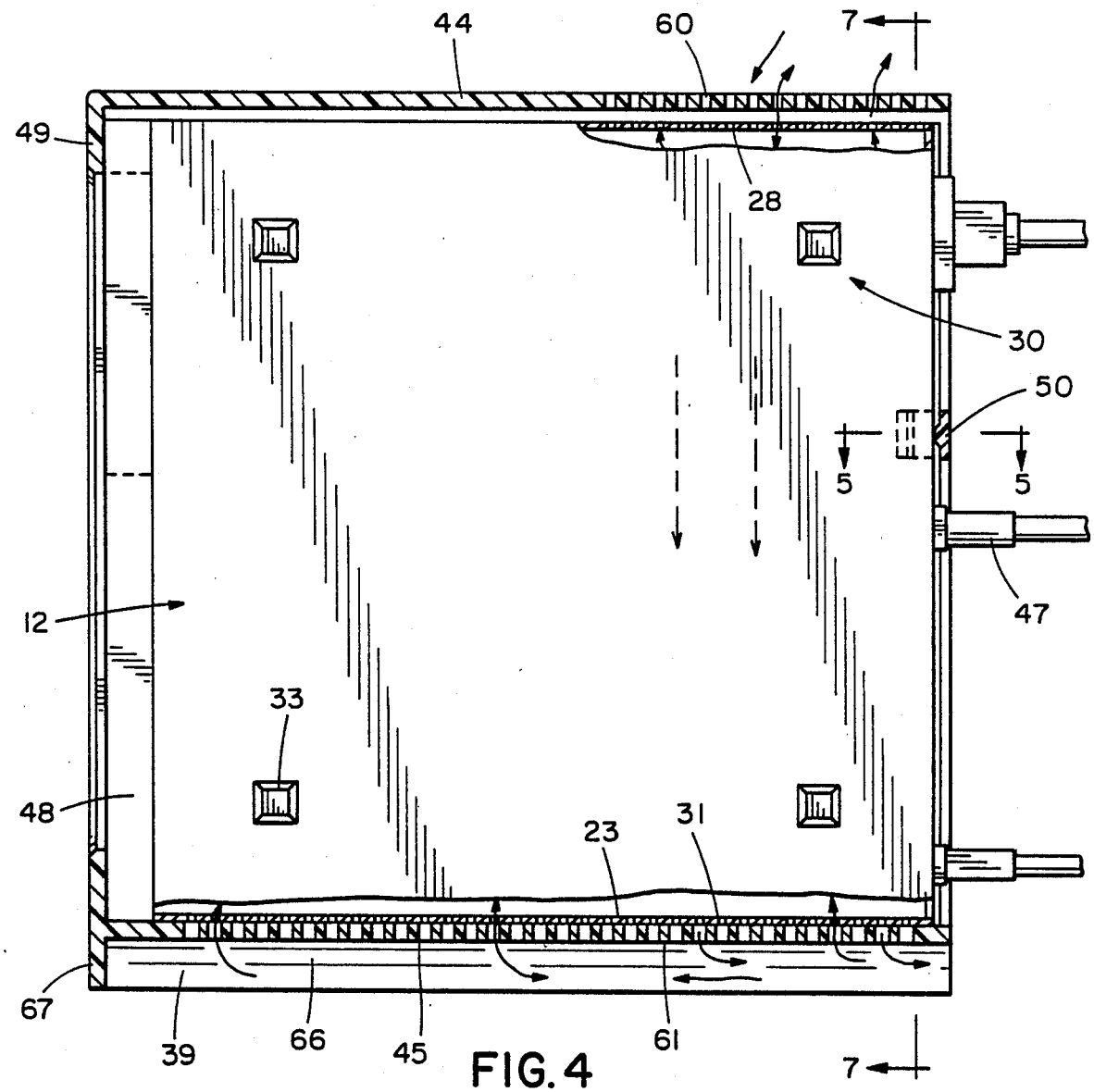
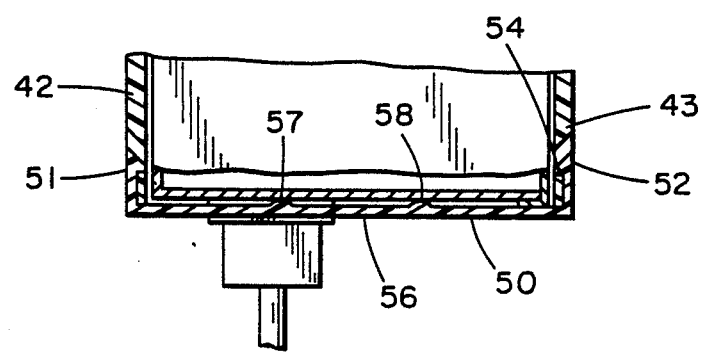
FIG. 4
FIG. 5

COMPUTER STAND

BACKGROUND OF THE INVENTION

In recent years, there has been an increasing number of computers designed for vertical orientation, sometimes referred to as "towers" because the vertical computers occupy significantly less counter space and also may be located on the floor in the work area eliminating the need for counter space altogether.

Vertically oriented computers are somewhat more costly, however, because they require additional finished cabinetry and also stand bracketry must be provided for attachment to one of the short side walls, usually to the short wall opposite the location of the disk drives.

In spite of the increase in the number of vertical computers, there continues to exist a considerable market for horizontal computers and, of course, there exist literally millions of horizontal computers today in businesses throughout the world.

While it would be desirable to devise a stand for existing horizontal computers, such a stand would expose the base of the horizontal computer and usually this surface is unsightly because it is unfinished and has a plurality of exposed fasteners.

It is a primary object of the present invention to provide a vertical stand for horizontal computers that eliminates the problems noted above.

SUMMARY OF THE PRESENT INVENTION

In accordance with the present invention a computer stand is provided for supporting a horizontal computer in a vertical position that covers the computer almost in its entirety providing improved aesthetics on its side walls without in any way inhibiting the normal flow of venting air through the computer.

This stand may be sold either with the computer to permit the user to elect horizontal or vertical installation, or may be sold as an after-market stand that enables existing users to switch to vertical mounting, if desired.

Toward these ends the present computer stand includes a rectangular sleeve-like housing into which the computer is slid from back to front. The sleeve conceals the unfinished computer base and hides its projecting feet, and it has suitable aesthetic treatment on its outer side walls and top providing the desired housing styling on all visible areas.

An integral bezel on the front of the sleeve limits forward movement of the computer in the sleeve and a releasable stop on the back of the sleeve prevents rearward movement of the computer therein.

The lower wall of the sleeve is spaced from the supporting surface by feet, and it has venting apertures therein that with vents in the top wall of the sleeve are aligned with vents in the computer side walls so that the sleeve permits cooling air flow through the computer. The rear entry of the computer into the sleeve also permits the computer to be installed in the sleeve without disconnecting any of its cable connectors.

Other objects and advantages of the present invention will appear from the following detailed description.

BRIEF DESCRIPTION OF THE DRAWINGS

FIG. 1 is a perspective view of a work station with the present computer stand supporting a computer on the floor;

FIG. 2 is an enlarged perspective of the computer stand illustrated in FIG. 1;

FIG. 3 is a rear exploded perspective of the present computer stand and horizontal computer;

FIG. 4 is a longitudinal section through the computer stand and computer according to the present invention taken generally along line 4—4 of FIG. 2;

FIG. 5 is a fragmentary section of the releasable rear stop taken generally along line 5—5 of FIG. 4;

DETAILED DESCRIPTION OF THE PREFERRED EMBODIMENTS

Figure 6:
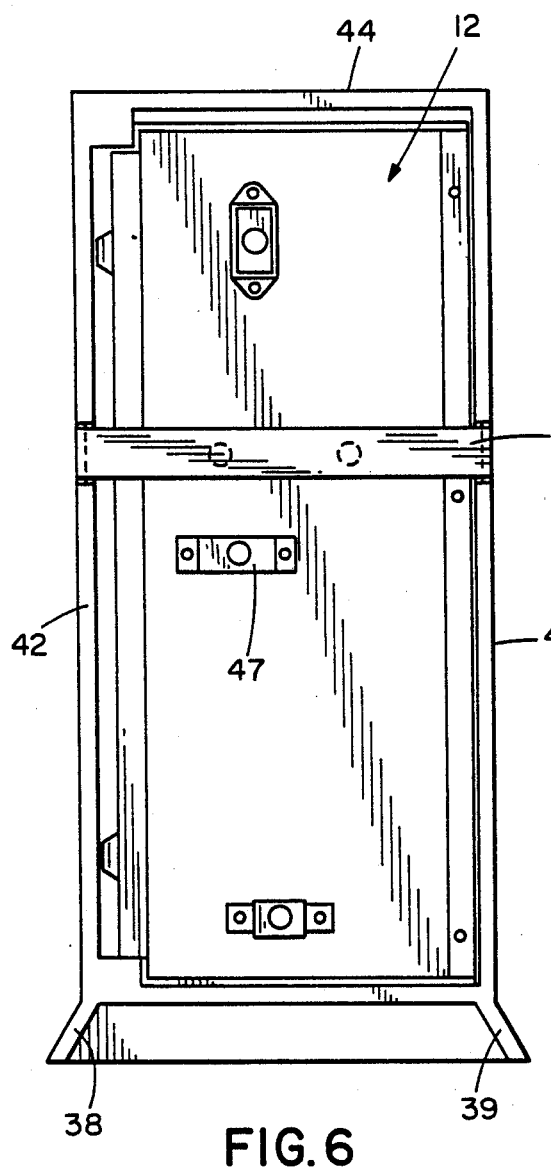
FIG. 6 is a rear view of the computer stand enclosing the computer with the releasable stop in position.

Referring to the drawings and particularly FIGS. 1 to 7, a computer assembly 10 is illustrated that consists of a stand 11 that receives and supports a horizontal computer 12 in a vertical position, and as seen in FIG. 1 it permits the computer 12 to be positioned vertically on the floor in the work station area conserving space, enabling the use of a smaller table 15, since it only supports the keyboard 16 and a CRT 17.

The computer stand 11 consists of one or two plastic moldings. When made in two pieces, one mold forms the upper half of the stand 11, and one the lower half and they are joined by gluing along a horizontal midplane.

Figure 7:
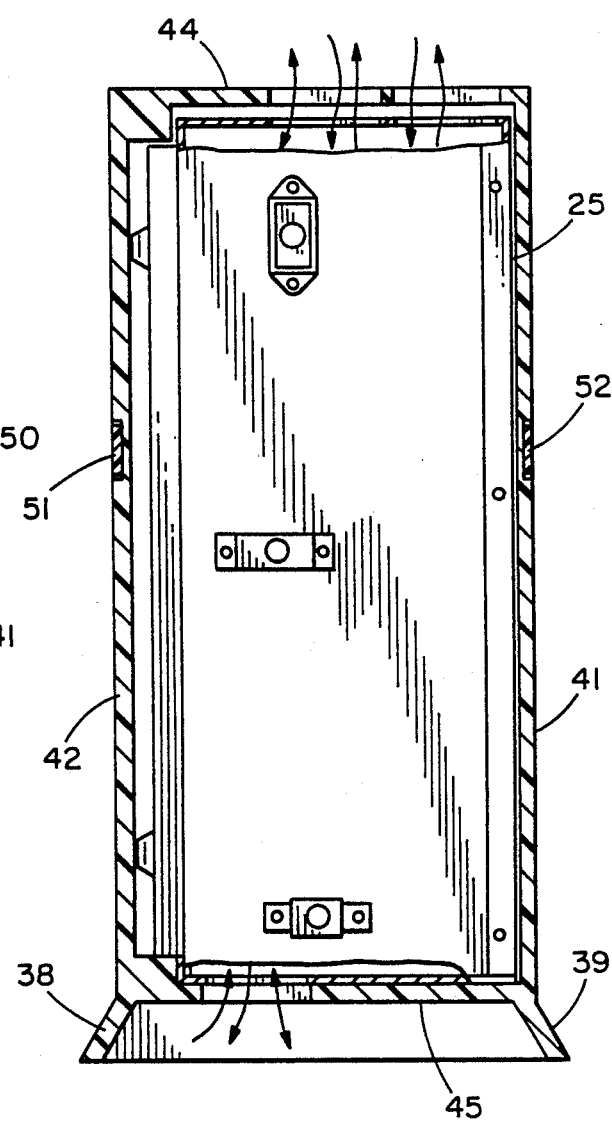
FIG. 7 is a cross-section of the stand and computer taken generally along line 7—7 of FIG. 4.

The horizontal computer 12 is, by itself, conventional and includes a base plate 20 that supports various components in the computer 12 surrounded by a three-sided cover 21 having parallel spaced side walls 22 and 23 (see FIG. 4), and an interconnecting "top" wall 25 (see FIG. 7).

Computer front panel 26 includes a disk drive 27 as seen in FIG. 2.

As seen in FIGS. 2 and 4, computer side panel 22 has two parallel rows of vents 28 toward the rear of the computer that permit cooling air to be drawn into the computer through the vents through a power supply area 30. This cooling air exits the computer through a longer row of vent slots 31 in side wall 23 as seen in FIG. 4.

As seen in FIG. 3, for example, the bottom plate 20 has a plurality of projecting feet 33 for supporting the computer on a horizontal surface and many exposed fasteners 34, all of which are visible and unsightly with the computer in a vertical position in the work area if a conventional stand is utilized to position it vertically.

It should be understood that all the exterior surfaces of the stand 11 are stylized to present pleasing aesthetics in the workplace even though such stylization is not shown in any detail in the drawings.

As seen in FIGS. 3 to 7, the stand 11 includes a vertically elongated rectangular sleeve 36 with outwardly diverging integral feet 38 and 39 that space the sleeve 36 above the supporting surface for stabilization and cooling.

Sleeve 36 includes spaced parallel side walls 41 and 42, top wall 44 and bottom wall 45 spaced about an inch above the lower surfaces of the feet 38 and 39.

It should be understood that the stand 11 is not designed to be universally utilized to accommodate a variety of computer configurations, but rather it enables a computer manufacturer to offer a stand for its own standardized horizontal computer configurations.

Toward this end, the side walls 41 and 42 and the top and bottom walls 44 and 45 are designed to closely encompass a specific horizontal computer housing as can readily be seen in FIG. 6 and 7, for example.

As seen in FIGS. 3 and 4, the stand 11 is designed so that the computer 12 is inserted therein from the rear eliminating the necessity for disconnecting any already planted cable connectors such as connectors 47. As the computer is slid forwardly in sleeve 36, its forward bezel 48, as seen in FIG. 4, engages and is stopped by an integral flange bezel 49 on sleeve 36. The computer 12 is held in this position by a releasable stop 50 that has integral flexible bards 51 and 52 that engage in apertures 54 in the rear of both side walls 41 and 42. Stop 50 is released by depressing area 56 between integral projections 57 and 58 that bends barbs 51 and 52 outwardly from apertures 54.

The sleeve 36 is designed to accommodate the vents 23 and 28 in the computer side walls 22 and 23 with the provision of vent rows 60 in the top wall 44 and vent row 61 in the bottom wall 45 that are adjacent and contiguous with the vent rows 28 and 31 in the computer housing.

Vents 60 permit air flow into the computer through computer vents 28 in the power supply area 30 from where it flows downwardly through computer vents 31 and stand vents 61 in lower wall 45, exiting the stand rearwardly between the legs 38 and 39.

While open area 66 between legs 38 and 39 is closed at the front by a forward wall 67, it should be understood that wall 67 could be eliminated to permit air to exit either forwardly or rearwardly.

Figure 8:
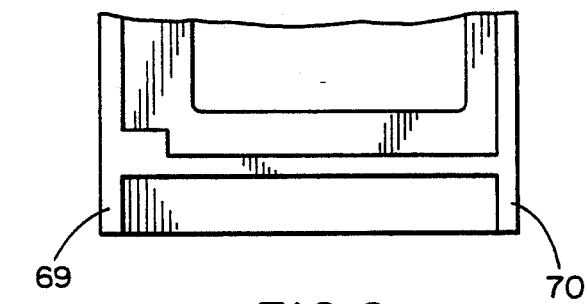
FIGS. 8 and 9 are lower fragmentary rear views of alternative stand feet configurations.
Figure 9:
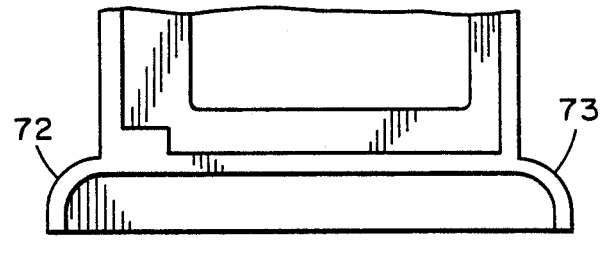

As seen in FIGS. 8 and 9, the stabilizing legs 38 and 39 can be replaced by vertical legs 69 and 70 shown in FIG. 8 or outwardly extending arcuate legs 72 and 73 illustrated in FIG. 9.

Figure 10:
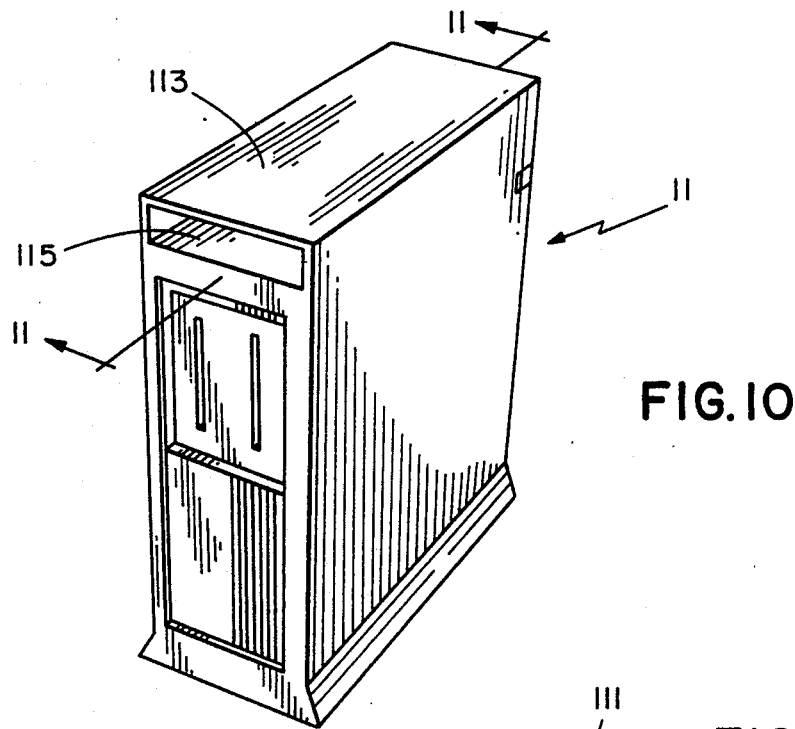
FIG. 10 is a perspective view of a somewhat modified computer stand according to the present invention with storage slots.
Figure 11:
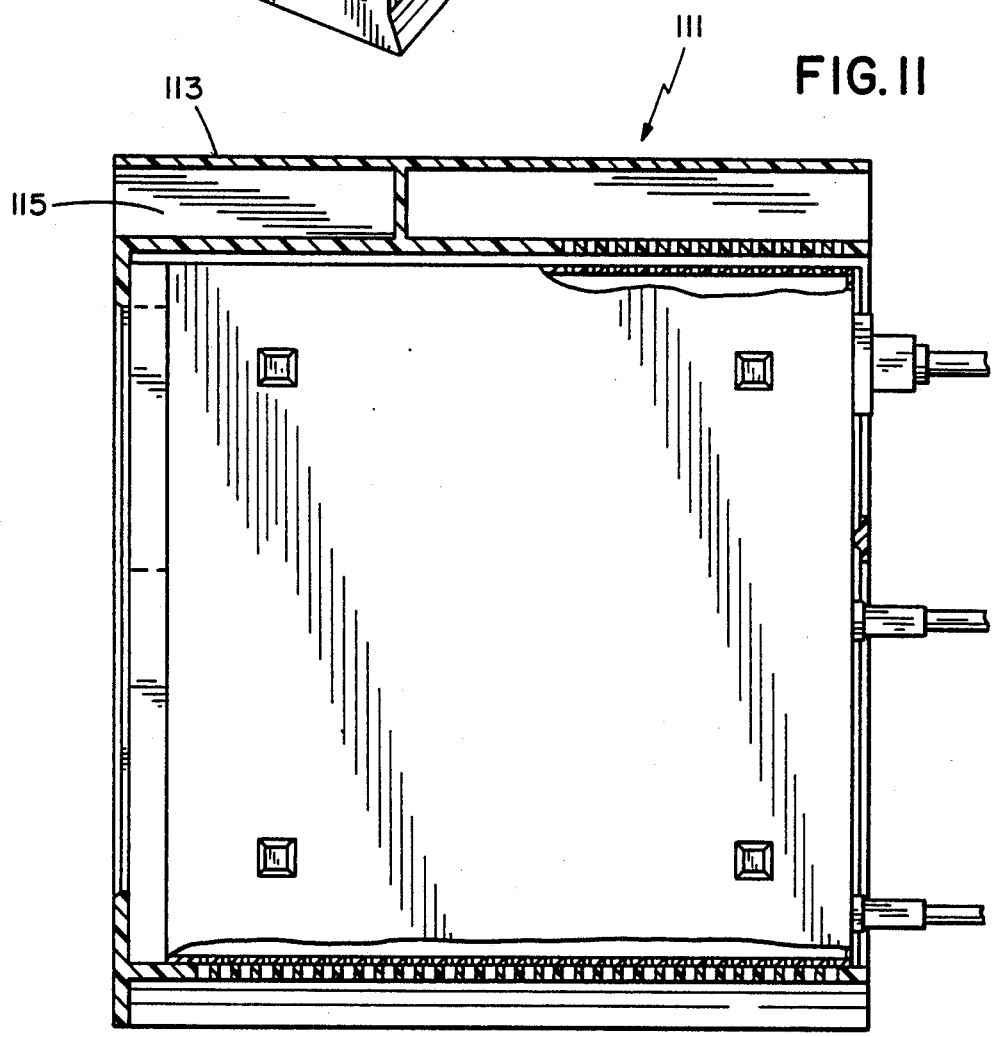
FIG. 11 is a longitudinal section taken generally along line 11—11 of FIG. 10.

Referring to FIGS. 10 and 11, a somewhat modified computer stand 111 is illustrated that is identical to the computer stand 11 illustrated in FIGS. 1 to 7 except for an integral upwardly extending receptacle 113 that defines a forwardly opening slot 115 for receiving and storing floppy disks.

What is claimed is:

1. A computer assembly adapted to be used in either a horizontal or vertical orientation, comprising: an inner generally rectangular housing including an unfinished base plate supporting a plurality of computer components and a cover enclosing the components on the base plate and including spaced parallel sides, a plurality of feet projecting transversely to the base plate for supporting the computer inner housing in a horizontal position on a horizontal surface, and an outer housing for supporting the inner housing in a vertical position without any vertical mount bracket on the inner housing including a stand portion adapted to engage a supporting surface and having a horizontal support surface for receiving one of the inner housing cover sides, a vertical wall for substantially completely covering the unfinished inner housing base plate and a top wall, said vertical and top walls being positioned closely adjacent and engageable with the inner housing base plate feed and other inner housing side to minimize envelope size and constructed to vertically support the inner housing without any additional brackets on the inner housing, a plurality of vents in the outer housing top wall, said outer housing having a sufficiently large rear opening to permit the forward insertion of the inner housing therethrough, and a bezel on the forward end of the vertical wall having a sufficient lateral extension to prevent the base plate and its feet from being viewed from the front of the outer housing, whereby the base plate is not visible in either horizontal or vertical positions.

2. A computer assembly as defined in claim 1, wherein the outer housing includes an elongated rectangular sleeve that encompasses substantially the entire inner housing.

3. A computer stand assembly as defined in claim 2, wherein the bezel includes an integral bezel on the front of the sleeve extending entirely therearound that limits forward movement of the inner housing therein.

4. A computer assembly as defined in claim 2, including means for preventing backward movement of the inner housing in the sleeve.

5. A computer assembly as defined in claim 2, wherein the sleeve has an inner configuration complementary to the outer configuration of the inner housing.

6. A computer assembly as defined in claim 2, including vents in both of the cover sides permitting vent air to pass therethrough, and said vents including vents in the outer housing sleeves to permit the same vent air to pass therethrough.

7. A computer assembly as defined in claim 1, including vents in the sides of the inner housing cover permitting cooling air to pass therethrough, and said vents in the outer housing aligned with the vent means in at least one of the cover sides.

8. A computer assembly adapted to be used in either a horizontal or vertical orientation, comprising: an inner generally rectangular housing including an unfinished base plate supporting a plurality of computer components and a cover enclosing the components on the base plate and including spaced parallel sides, a plurality of feet projecting transversely from the base plate for supporting the computer inner housing in a horizontal position on a horizontal surface, an outer housing for supporting the inner housing in a vertical position without any vertical mount bracket on the inner housing including a stand portion adapted to engage a supporting surface and having a horizontal support surface for receiving one of the inner housing cover sides, a sleeve on the stand for receiving and substantially encompassing the inner housing, said sleeve having side walls closely adjacent and engageable with the inner housing base plate feet and cover to minimize envelope size and constructed to vertically support the inner housing without any additional brackets on the inner housing, said outer housing having a sufficiently large rear opening to permit the forward insertion of the inner housing therethrough, a bezel on the forward end of the sleeve having a sufficient lateral extension to prevent the base plate and its feet from being viewed from the front of the outer housing, said bezel also limiting forward movement of the inner housing in the outer housing sleeve, said inner housing having vents to permit cooling air to pass therethrough, and vents in the sleeve aligned with at least some of the vents in the inner housing to permit the same cooling air to pass therethrough.

9. A computer assembly adapted to be used in either a horizontal or vertical orientation, comprising: an inner generally rectangular housing including an unfinished base plate supporting a plurality of computer components and a cover enclosing the components on the base plate and including spaced parallel sides, a plurality of feet projecting transversely from the base plate for supporting the computer inner housing in a horizontal position on a horizontal surface, an outer housing for supporting the inner housing in a vertical position without any vertical mount bracket on the inner housing including a stand portion adapted to engage a supporting surface and having a horizontal support surface for receiving one of the inner housing cover sides, a sleeve on the stand for receiving and substantially encompassing the inner housing, air vents in the sleeve, said sleeve having side walls closely adjacent and engageable with the inner housing base plate feet and cover to minimize envelope size and constructed to vertically support the inner housing without any additional brackets on the inner housing, said outer housing having a sufficiently large rear opening to permit the forward insertion of the inner housing therethrough, an integral bezel on the front of the sleeve to limit forward movement of the inner housing, and releasable means for preventing rearward movement of the inner housing in the sleeve.

10. A computer assembly as defined in claim 9, including vents in both of the cover sides permitting vent air to pass therethrough, and aligned vents in the outer housing sleeve to permit the same vent air to pass therethrough.

11. A computer assembly as defined in claim 9, wherein the sleeve is adapted to closely receive the inner housing and has an inner configuration complementary to the outer configuration of the inner housing.

12. A computer assembly adapted to be used in either a horizontal or vertical orientation, comprising: an inner generally rectangular housing including an unfinished base plate supporting a plurality of computer components and a cover enclosing the components on the base plate and including spaced parallel sides, a plurality of feet projecting transversely from the base plate for supporting the computer inner housing in a horizontal position on a horizontal surface, an outer housing for supporting the inner housing in a vertical position including a stand portion adapted to engage a supporting surface and having a horizontal support surface for receiving one of the inner housing cover sides, a sleeve on the stand for receiving and substantially encompassing the inner housing, said sleeve having side walls closely adjacent and engageable with the inner housing base plate feet and cover to minimize envelope size and constructed to vertically support the inner housing without any additional brackets on the inner housing, means permitting the inner housing to be inserted forwardly from the rear of the sleeve, an integral bezel on the front of the sleeve to limit forward movement of the inner housing, releasable means for preventing rearward movement of the inner housing in the sleeve, vents in both the cover sides permitting vent air to pass therethrough, aligned vents in the outer housing sleeve to permit the same vent air to pass therethrough, said sleeve being adapted to closely receive the inner housing and having an inner configuration complementary to the outer configuration of the inner housing.

* * * * *